United States Patent [19]
Kahn et al.

[11] 3,886,600
[45] June 3, 1975

[54] JOINT PROSTHESIS

[75] Inventors: Paul Kahn, San Francisco; James A. Stubstad, Lafayette, both of Calif.

[73] Assignee: Cutter Laboratories, Inc., Berkeley, Calif.

[22] Filed: Sept. 26, 1973

[21] Appl. No.: 401,021

Related U.S. Application Data

[63] Continuation-in-part of Ser. No. 162,936, July 15, 1971, abandoned, which is a continuation-in-part of Ser. No. 60,804, Aug. 4, 1970, abandoned.

[52] U.S. Cl.................. 3/1; 128/92 C; 128/DIG. 21
[51] Int. Cl. .............................................. A61f 1/24
[58] Field of Search.... 3/1; 128/92 C, 92 CA, 92 R, 128/DIG. 21

[56] References Cited
UNITED STATES PATENTS

| | | | |
|---|---|---|---|
| 2,679,245 | 5/1954 | Timmermans.................. | 128/92 CA |
| 3,462,765 | 8/1969 | Swanson ..................................... | 3/1 |
| 3,545,008 | 12/1970 | Bader......................................... | 3/1 |
| 3,593,342 | 7/1971 | Niebauer et al. ........................... | 3/1 |
| 3,739,403 | 6/1973 | Nicolle....................................... | 3/1 |
| 3,805,300 | 4/1974 | Tascon-Alonso et al.................. | 3/1 |

FOREIGN PATENTS OR APPLICATIONS

| | | | |
|---|---|---|---|
| 939,226 | 2/1956 | Germany........................... | 128/92 C |

OTHER PUBLICATIONS

"Silicone Rubber Implants for Replacement of Arthritic or Destroyed Joints in the Hand," by A. Swanson, Surgical Clinics of North America, Vol. 48, No. 5, Oct. 1968, pp. 1113–1127.

Primary Examiner—Ronald L. Frinks
Attorney, Agent, or Firm—Owen, Wickersham & Erickson

[57] ABSTRACT

This prosthesis for replacement of a skeletal hinged joint comprises a unitary member of elastomer having a central hinge portion with a stem at each end, the stems being inclined with respect to each other. Each stem has a base adapted for insertion into a medullary canal of a bone of the joint. The hinge has a web portion lying between thicker end portions adjoining the stems, to provide uniplanar hinging movement, the angle of inclination lying in this plane and providing a suitable normal rest position for the joint where the prosthesis has no restorative tensile or compressive forces. The elastomer is internally reinforced throughout, including the web. An open-pore, three-dimensional reticular outer layer over the stems insures tissue ingrowth right into this outer layer, thereby providing firm anchorage, the hinge portion being free from such tissue ingrowth.

38 Claims, 14 Drawing Figures

PATENTED JUN 3 1975

3,886,600

SHEET 1

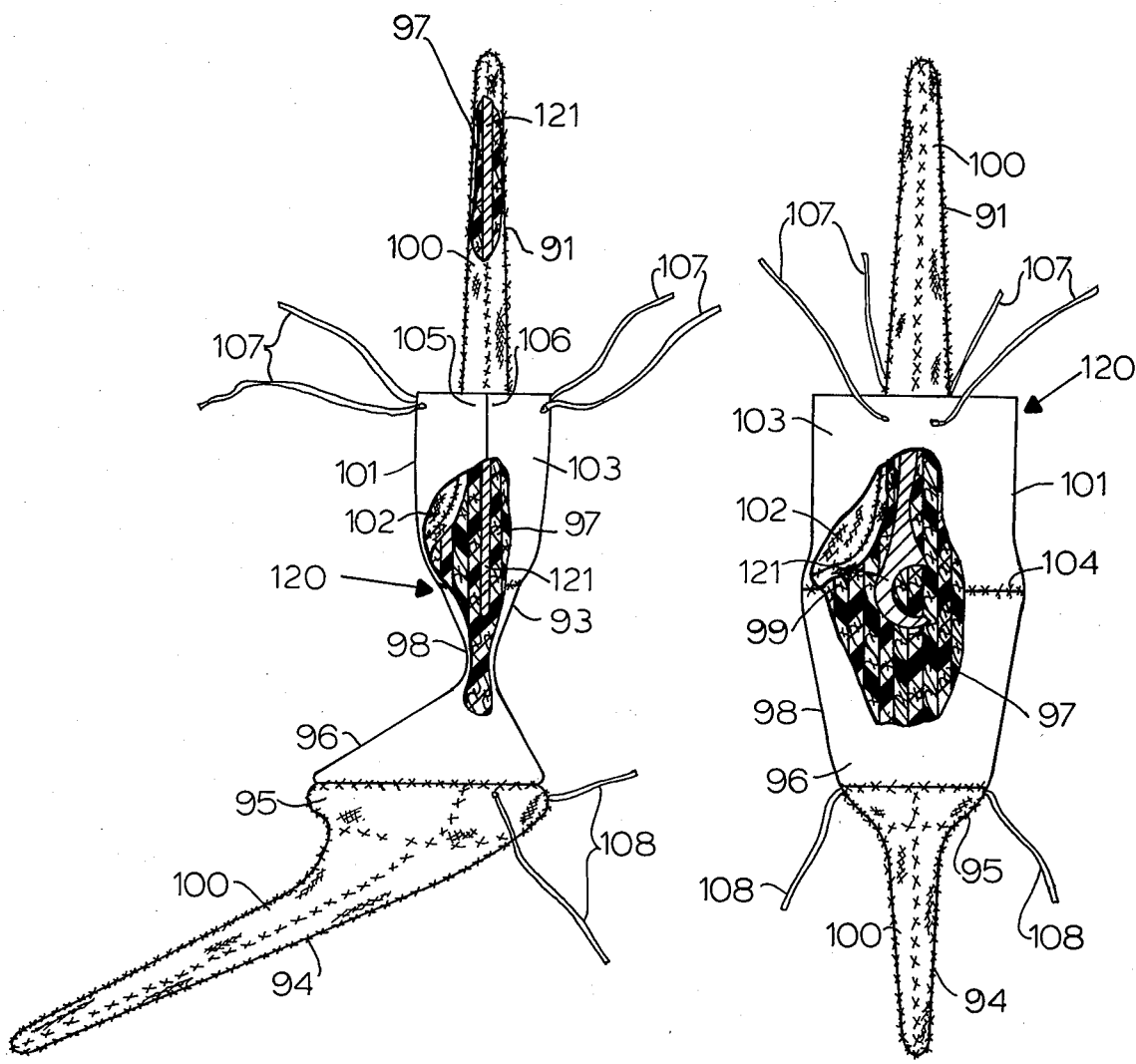

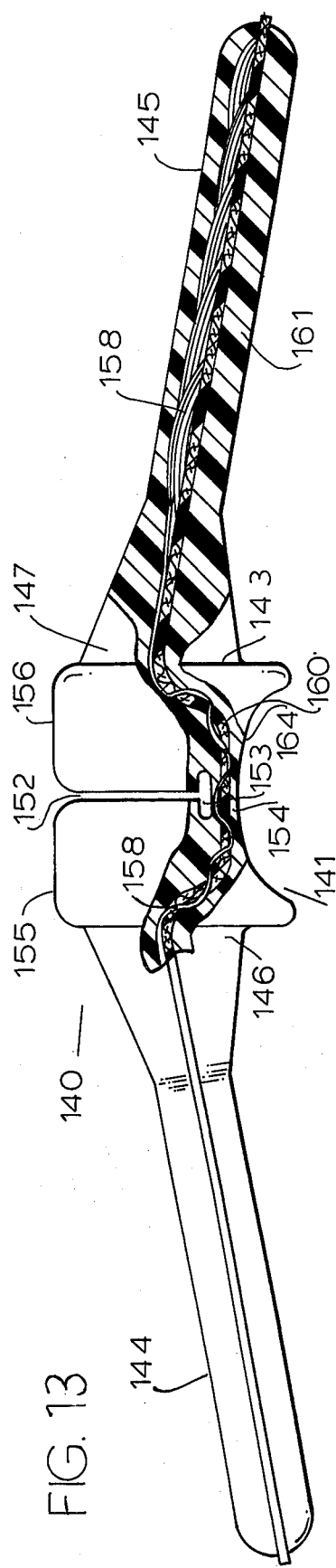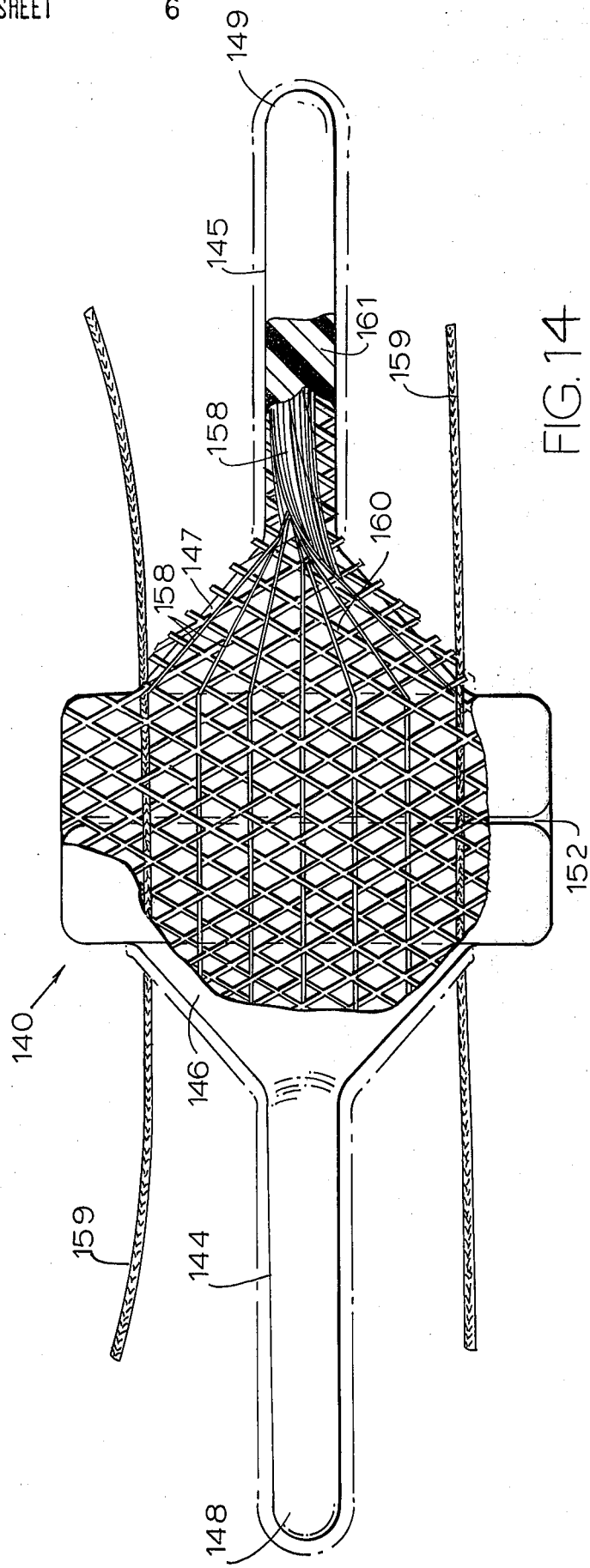

JOINT PROSTHESIS

RELATED APPLICATION

This application is a continuation-in-part of application Ser. No. 162,936, filed July 15, 1971, now abandoned, which was a continuation-in-part of application Ser. No. 60,804, filed Aug. 4, 1970 and now abandoned.

BACKGROUND OF THE INVENTION

This invention relates to an improved prosthesis for replacement of a hinged joint.

Prostheses currently available for replacement of hinged joints, such as elbows, knees and joints of the hand, are either rigid metal or plastic hinged devices or are softer elastomeric devices such as those for knuckle joints of the hand disclosed in U.S. Pat. Nos. 3,462,765 and 3,593,342. The metal or hard plastic devices are generally unacceptable for long term application since the stems implanted into the medullary canals of the bone often become loosened. It is believed that this effect results from high localized pressure loads imposed upon the bone by the hard-surfaced prosthetic material which tends to pinch off fine blood vessels and crush adjacent tissue, producing resorption of bone and necrotic degeneration in the affected zone. This effect is often noted only after the patient has been partially rehabilitated and then attempts to put the affected limb or member into normal vigorous use.

The devices made of softer material solved this particular problem, but other problems have sometimes been encountered, such as flexing or bending at the juncture between the stems and the central hinge portion of the implanted prosthesis, which thus causes subluxation of the joint. The life of a hinged prosthesis made of softer elastomeric material was found to be extended by thinning the central part of the hinge portion and strengthening that part with two layers of fabric mesh, such as that described for the knuckle prosthesis in U.S. Pat. No. 3,593,342. The mesh reinforcement, which also extends through the stem portions, has not been adequate to reduce or eliminate secondary bending at the base of the stems in those cases where the surgeon has not fully embedded the stems into the medullary canal of the bone or where he has not temporarily anchored the stems by sutures to the bone. In clinical trials with elbow prostheses having a similar configuration and structure, the mesh reinforcement running through the thin central web of the hinge portion did not materially prolong the life of the web. Fracturing at the web occurred, probably because greater flexing forces were imposed on the web as a consequence of the prosthesis being implanted in a part of the body which deals with greater loads and greater angles of bending than in knuckles in the hand. Secondary bending at the junction between the stems and the hinge portion was also a problem.

The above disadvantages are overcome, and other advantages are also obtained, by the present invention, as will become apparent from the description below. This invention provides a strong, reinforced prosthesis for replacement of a hinged joint such as the elbow, fingers, toes, knee, and shoulder. The prosthesis of this invention has a resilient, cushioning coating structure enclosing reinforcement means, and a fibrous overlayer on the stems to encourage ingrowth of the patient's tissue and firm bonding of the prosthesis to the desired elements of the patient's or host structure. Thus, the device of this invention avoids the rigid plastic or abrasive metal-to-bone facing, has been observed to insert readily with minimal infection occurrences, and has considerably extended the longevity of the prosthesis in use in patients. In addition, bonding of the components to each other is so efficiently and firmly effected in the present invention as to provide a reliable, load-bearing, high-strength transfer of loading from the reinforcing means across the elastomer jacket to the host bone. The reinforcement means in and at the stem portion is particularly advantageous in maintaining stability against undesired bending at places other than at the central part of the hinge portion.

SUMMARY OF THE INVENTION

The present invention concerns a prosthesis for the replacement of a damaged or diseased hinged joint in an animal skeletal structure, particularly in a human skeletal structure such as an elbow, a knuckle of the hand, a toe joint, a knee, or a shoulder. More particularly it concerns a prosthesis comprising a unitary, uniplanar device having a central hinge portion with a stem extending from each end of the hinge portion, the hinge portion being thicker at the ends where the stems join these ends and thinner at its central portion to provide a web capable of bending.

The prosthesis is composed of biocompatible elastomer with internal fibrous reinforcement arranged in a manner and in an amount which greatly increases resistance to bending in any direction in the stems, particularly at the juncture between the stems and the ends of the hinge portion. This reinforcement is also arranged in the web section of the hinge portion so as not to interfere with bending and yet to strengthen this part against fracture and thereby greatly extend the life of the implanted prosthesis and greatly increase lateral stability and resistance to edge-tearing at the web section.

These improvements are preferably accomplished by a large number of cords extending longitudinally through essentially the entire prosthesis. These cords may be bunched together or twisted in the stem regions so that they provide a significant portion of the bulk of the stems, but as they pass through the web section of the hinge portion they are arranged substantially parallel and in a single plane. These cords and their arrangement are superior to layers of mesh reinforcement, since such layers contribute essentially no resistance to bending where the stems join the hinge portion; moreover, since only half the threads in mesh are arranged longitudinally in the web section, mesh is less effective for preventing fracture there. An outermost layer of a tissue-ingrowth-receptive, open-pore fabric covers the stems and forms a tight, firm, non-separable bond between the prosthesis and the host tissue following implantation.

An important feature of the invention is that the stems are inclined with respect to the web so as to form an included angle in the range of about 90° to about 160°, depending on which joint of the body is being replaced. Having stems angled from the web part of the hinge portion in what is indicated as the "rest position", i.e., the angle at which there is no bending or flexing at the web, significantly reduces the possibility for extreme stresses to which the web portion can be subjected in use during extension or flexion movements. In addition, a hinged prosthesis in which the stems are made to angle from the web portion, after it is implanted, will be under little or no bending stresses when the body joint is in a normal rest position, since the angle of the prosthesis more or less conforms to the angle of the body joint in its rest position. This angulation, furthermore, contributes to prolonging the flex life of the prosthesis, thus avoiding the constant bending stresses or extreme bending stresses which a hinged prosthesis having stems extending in a straight line is subject to.

The prosthesis may also and preferably does have suture cords extending from the base of one or both stems. These suture cords fulfill the purpose of temporarily achoring the stem or stems firmly into the medullary canals of the bone, to prevent slippage or rotation, until such time that the stems are firmly bonded to the bone through tissue ingrowth. These cords may also be arranged so that they extend interiorly through the hinge portion and then extend exteriorly at the base of the stem, so that they resemble the natural collateral ligaments which usually have to be resected during the installation of the prosthesis. It is better to have such suture cords a part of the prosthesis, since they can be securely installed at the time the prosthesis is made, whereas if they are left to the surgeon to apply, they might not be properly secured and they might tend to tear through the elastomer.

In some instances, the internal reinforcement further includes a rigid core member, usually of plastic or metal, which extends through most of a stem and into the adjacent end of the hinge portion but not into the web section. This rigid core member is particularly important where deeper resection of an affected joint, an elbow for example, requires a prosthesis having rigidity in the area which replaces the resected bone. The words "rigid" and "rigidity" as used herein are used in their normal meanings: for example, an ulna bone is rigid in this sense, while the stems shown and described in U.S. Pat. No. 3,593,342 are not rigid. Thus, a two-by-four piece of lumber is rigid in this sense and a carpet is not.

In addition to internal reinforcement means for stabilizing the prosthesis against secondary bending in the region at the base of the stems, a prosthesis of this invention may be structured to provide additional stabilizing means to assure further support against such undesired bending. One such additional stabilizing means includes buttresses integral with but extending outwardly from the base of one or both stems. Such buttresses generally are shaped to conform to notches cut into the side of the resected bone of the joint so that the stem is locked into the bone. The additional thickness and geometry of the stems provided by the buttresses helps to resist bending forces. Additional stabilizing means may also be provided by a non-rigid, moderately flexible cuff member secured at the base of a stem and extending outwardly over a portion of the stem. When the stem is inserted into the medullary canal of a bone, such a cuff member snugly encircles the outer surface of the bone. The cuff member has an inner surface of open-pore material, so that bony tissue grows into this surface and firmly bonds to the cuff member. The outer surface of the cuff member generally is made of a material resistant to tissue ingrowth.

The invention will be better understood by the detailed description of specific embodiments which follow.

BRIEF DESCRIPTION OF DRAWINGS

The device or article of the present invention and some modes of carrying out the invention will also be illustrated by the annexed drawings, wherein:

FIG. 8 is a front elevational view of still another modified form of elbow prosthesis embodying the principles of the invention, with a cuff partly broken away and shown in section.

FIG. 9 is a side view of FIG. 8, partly broken away and shown in section.

FIG. 13 is an enlarged view in side elevation of the knuckle prosthesis of FIG. 12, the outer tissue-ingrowth layer being removed.

FIG. 14 is a top plan view of the knuckle prosthesis of FIG. 12, again with the tissue-ingrowth layer removed.

DETAILED DESCRIPTION OF THE INVENTION

The elbow prosthesis of FIGS. 1–4

Figure 1:
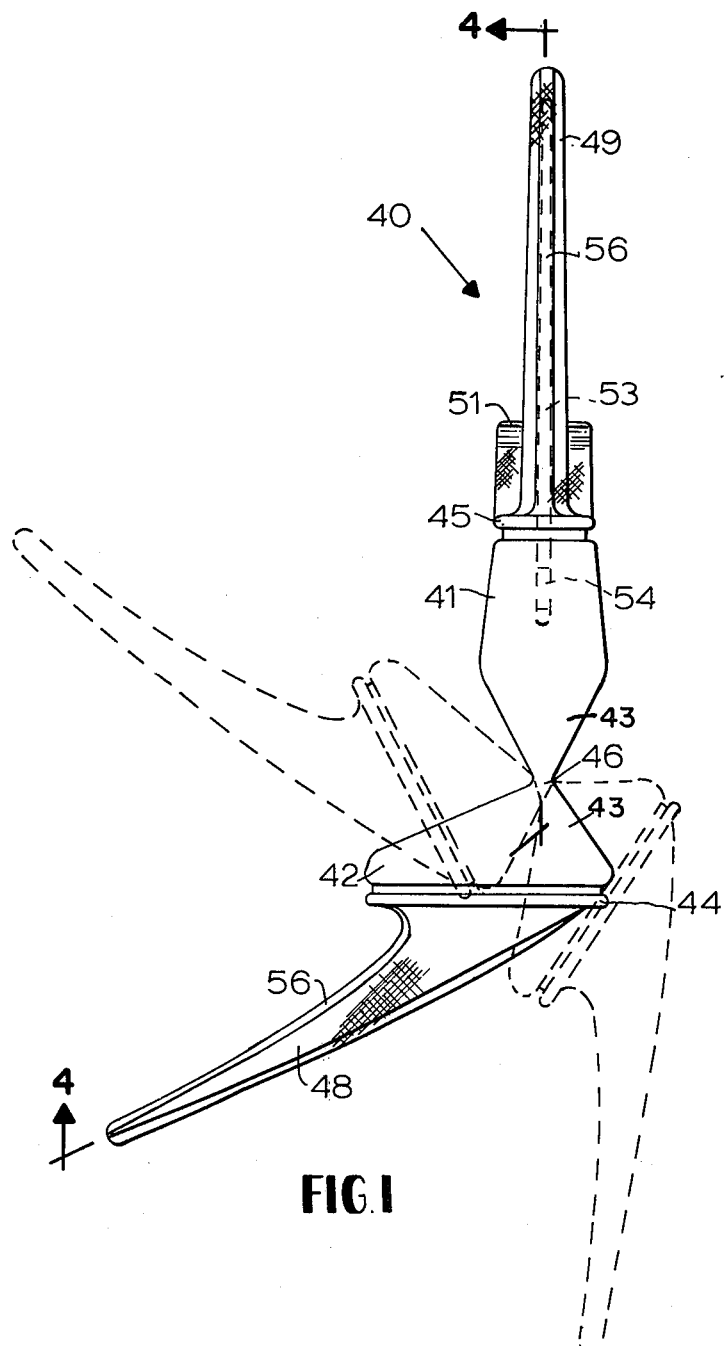
FIG. 1 is a front elevational view of an elbow prosthesis embodying the principles of the invention, showing also in phantom the lower part of the device at various bent positions.
Figure 2:
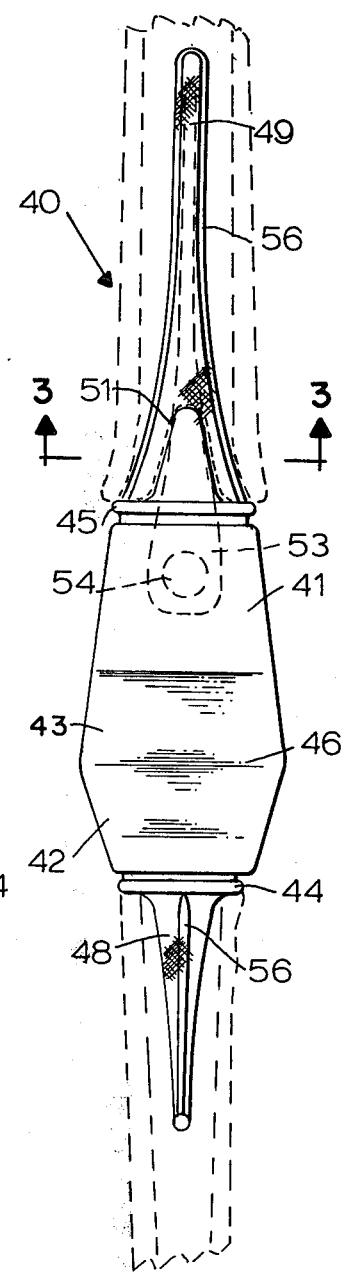
FIG. 2 is a side view of the prosthesis of FIG. 1 placed in position in an arm, the humerus and ulna being shown in phantom.
Figure 3:
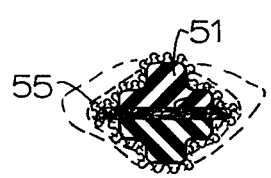
FIG. 3 is a cross-sectional view taken on line 3—3 of FIG. 2 and showing how an interlocking buttress is emplaced at the base of the humerus, the humerus being shown in phantom.
Figure 4:
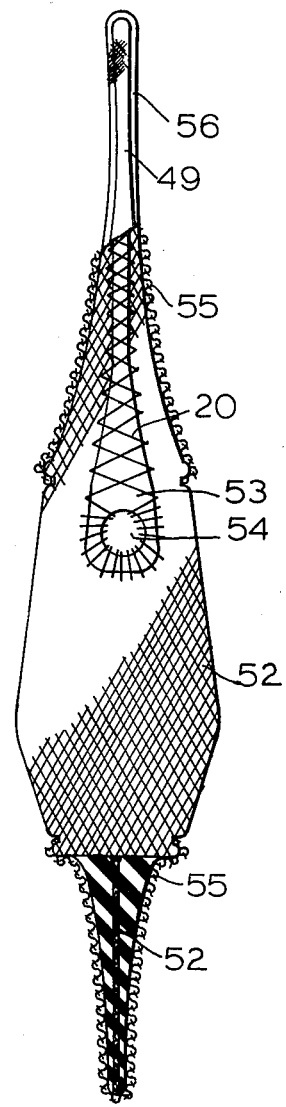
FIG. 4 is a front elevational view of the inner structure of the prosthesis of FIG. 2, the elastomer and coating being removed to show both the fibrous and the rigid metal reinforcement means.

In FIGS. 1 through 4 an elbow prosthesis 40 comprises a central portion 43 having thick ends, namely an upper end portion 41 and lower end portion 42. The lower end 42 terminates in an elongated shelf 44 adapted to abut firmly on the upper end of a suitably resected ulna when emplaced, and the upper end 41 terminates in a shelf 45 adapted to abut firmly on the lower end of a suitably resected humerus when emplaced. The body of the prosthesis 40 is formed of an inert elastomer, advantageously silicone rubber. At about the middle of the central portion 43 is provided an isthmus or web 46 which acts as a hinge enabling relative swinging motion along a single plane between the upper and lower portions 41 and 42 of the prosthesis 40, while limiting lateral and rotational freedom.

Attached to the lower shelf 44 is a lower stem 48 shaped somewhat like a ship's keel or flattened cone, tapering downwardly and adapted to be inserted into the medullary canal of an ulna. Attached to the upper shelf 45 is an upper stem 49, also of elongated, generally conical shape, tapering upwardly and adapted to be inserted into the medullary canal of a humerus. As shown in FIG. 1, the stems 48 and 49 form an included angle in relationship with web 46 when the prosthesis is in a "rest position," i.e., where there is no bending or flexing at web 46. Although this included angle can be in the range of 90° to 160° at the unflexed state, preferably this angle is within the range of about 100° to about 120°. In the illustrated embodiment, the angle is 105°. Within the upper stem 49 and the upper end portion 41 of this embodiment is a metal or rigid plastic reinforcing member 53, advantageously of titanium metal. The lower stem 48 may also have a reinforcing member similar to that of member 53. Each stem 48 and 49 is made of elastomer in which is embedded fibrous reinforcement 52. The fibrous reinforcement 52 can be any flexible material, for example, a polymeric material such as Dacron, or it can be metal, fiberglass or carbon. It can take the form of one or more layers of mesh or other woven forms, or, preferably, it can be a multiplicity of cords running more or less longitudinally the full length of the prosthesis. The cords can be arranged in a variety of ways, preferably twisted or braided in the stem portions, but substantially parallel and in a single plane as they pass through web 46. Regardless of the configuration of the fiber reinforcement 52, it is impregnated with the elastomer, and the combination provides a strong cushioning element which is firm yet non-injurious to bone.

The preferred reinforcement includes a plurality of longitudinally arranged braided cords occupying most of the space in the stems and which extend almost the full width of the web 46. Over the cushioning element of each stem is an open-pore, tissue enmeshing covering 55. This covering 55 can be any biocompatible fabric, e.g., Dacron or Teflon mesh or velour, or in the case where the prosthesis is made of an elastomeric form of polyurethane, the exterior surface layer can also be polyrethane which is tridimensionally reticulated. When mesh is used as the covering 55, preferably it has two or more layers, and is secured to the stems by stitches running through the reinforced stems at numerous places. Velour covering can be similarly secured, or it can be backed with the elastomer and vulcanized to the elastomer of the stem body, or the combination of stitching and vulcanization can be used. There is no fabric coating 55 on the portions 41, 42 and 43 so that tissue ingrowth is prevented at these places. A portion 56 of the reinforcement 52 may extend outwardly from two opposite edges of each stem 48 and 49 whereby suturing of the fabric to the portion 56 can be effected, if desired.

A stabilizing, or buttress element 51, here triangular in cross section, extends outwardly at the base of the upper stem 49 at each side in order to fit into corresponding notches provided in a humerus when later emplaced. This buttress element 51 is important in stabilizing the prosthesis 40 at the mouth of the resected bone by preventing secondary hinge-like motion of the stem 49 between the resected head of the bone and the shoulder 45 of the stem 49. Intramedullary stems of previous prostheses have been restricted to the available cross section of the intramedullary canal. This buttress element 51, which fits through notches made in the cortex by the surgeon, provides a structural cross section of the stem 49 which is thicker than the cross section of the intramedullary canal and thereby imparts greatly improved stability for the entire prosthesis. A secondary feature of the buttresses 51 is that new periosteal growth will encapsulate and grow into the tissue-ingrowth surfaces 55 of the buttresses 51 and strengthen the interfaces between the bone and the prosthesis 40.

The metal reinforcing element 53 is disposed within the upper portion of the prosthesis 40, extending suitably from adjacent the upper end of the stem 49 to slightly below the shelf 45. This rigid reinforcing member 53 helps greatly to stabilize the prosthesis at the mouth of the resected bone and prevents secondary hinge and subluxation effects, particularly when the member is used in combination with the fibrous reinforcement 52 and the buttresses 51. In the embodiment of FIGS. 1–4, the core 53 is of titanium metal, and bonding to the elastomer body is aided by an aperture 54 in the core 53 enabling interlocking. In addition, it is advantageous also to "stitch" the metal, the sutures 20 passing around the metal piece 53 and the fibrous reinforcement 52, and through the aperture 54. The metal reinforcing element 53 can also be made to adhere firmly to the elastomer by coating the metal with a suitable bonding agent.

Figure 5:
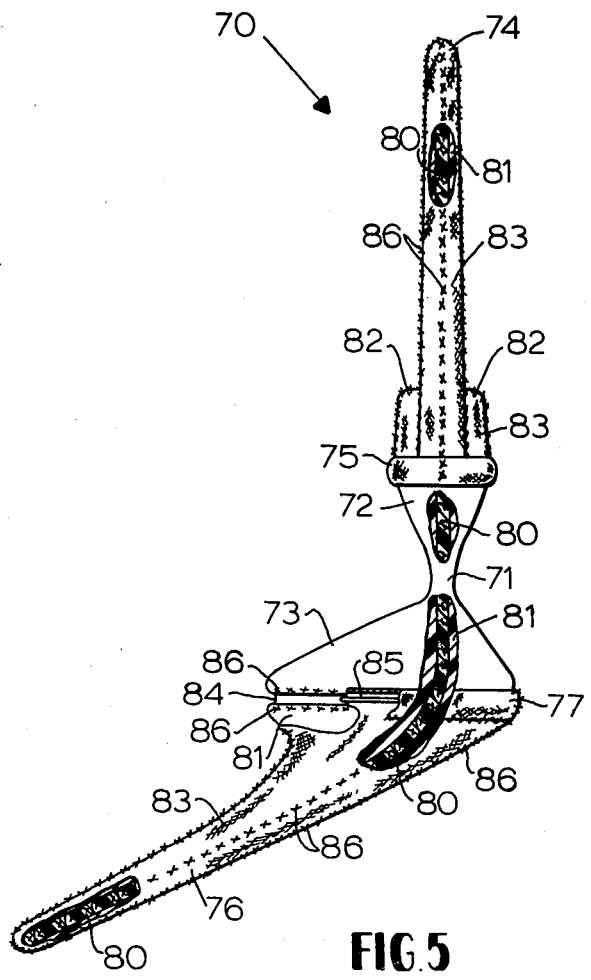
FIG. 5 is a front elevational view of a modified form of elbow prosthesis embodying the principles of the invention, partly broken away and shown in section.

The elbow prosthesis of FIG. 5

FIG. 5 shows a modified form of elbow prosthesis 70, generally similar to the elbow prosthesis 40 but with some important differences. Again, there is a wide, thin web 71 between thicker ends, namely an upper end portion 72 and a lower end portion 73. An upper stem 74 meets the upper end portion 72 at a shoulder 75, while a lower stem 76 meets the lower end portion 73 at a shoulder 77. The two stems 74 and 76 also are angled with respect to web 71 to form an icluded angle, in this embodiment, about 105°. The main difference between the prosthesis 70 and the prosthesis 40 is the absence of rigid metal or plastic core 53 in prosthesis 70. The needed degree of rigidity, although not as pronounced, is supplied by a core 80 as described for the fibrous reinforcement 52 of the prosthesis 40. Preferably, the core 80 contains a plurality of longitudinally arranged cords or strands, preferably tightly twisted or braided and impregnated with elastomer. The reinforcing core member 80 extends all the way through the prosthesis and in the area of the web portion 71, the cords are spread substantially all the way across. Preferably, at this location the cords are arranged longitudinally with respect to the stems and preferably have a braided form.

The body portion 81 is elastomer and can be thicker or thinner depending on what portion of the prosthesis is involved. For example, in the upper and lower end portions 72 and 73 of the hinge section it is guite thick. In the stem portions it can be guite thin since the bulk of the stems consists chiefly of reinforcing cords. Buttresses 82, here preferably of a rounded rectangular shape, strengthen the body 81 in addition to providing stability as discussed before.

A tissue-ingrowth-receptive fabric 83 covers the upper and lower stems 74 and 76 but not the portions in between the stems, and the fabric 83 is secured to the body 81 by sutures 86, and may also be adhesively secured to the body 81 in the manner described for prosthesis 40.

This prosthesis 70 may be preferred where the anatomical load requirements do not reach such values as to call for metal cores, because it is somewhat lighter, less costly, and avoids the disadvantages of metal. Since the prosthesis 70 is more homogeneous than the prosthesis 40 there is less risk of the core separating from the body and abrading bony tissue.

Figures 6, 7:
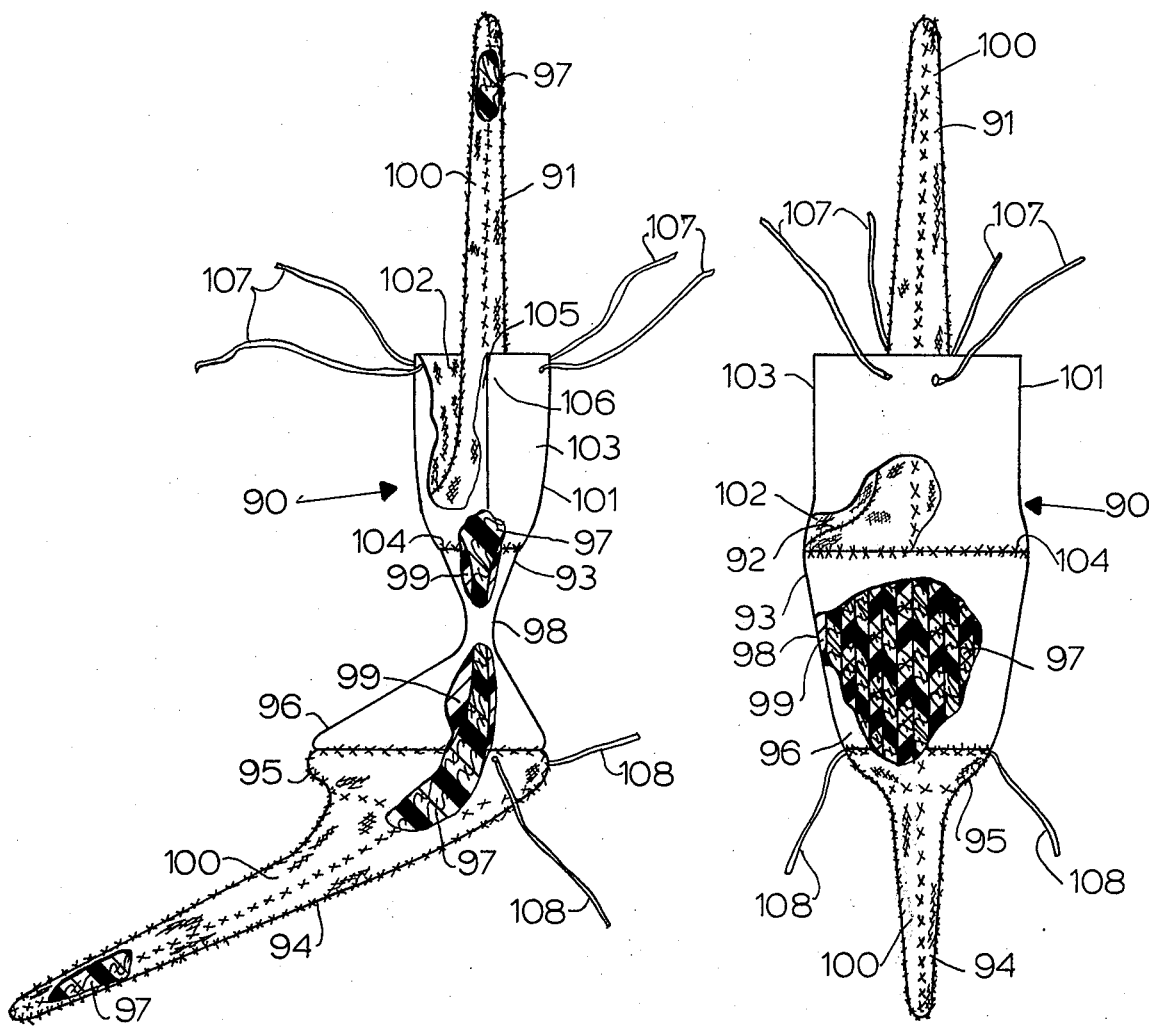
FIG. 6 is a front elevational view of another modified form of elbow prosthesis embodying the principles of the invention, partly broken away and shown in section, showing a stabilizing cuff on one of the stems.
FIG. 7 is a side view of FIG. 6, partly broken away and shown in section.
Figure 10:
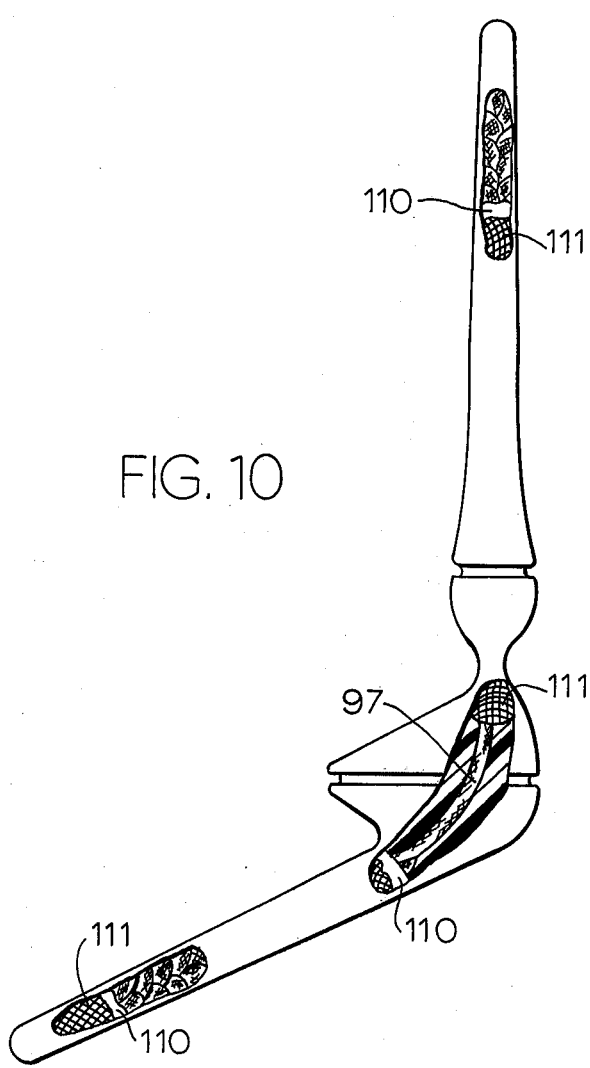
FIG. 10 is a front elevational view of the elbow prosthesis of FIG. 6 with the outer, tissue-ingrowth covering and cuff removed.
Figure 11:
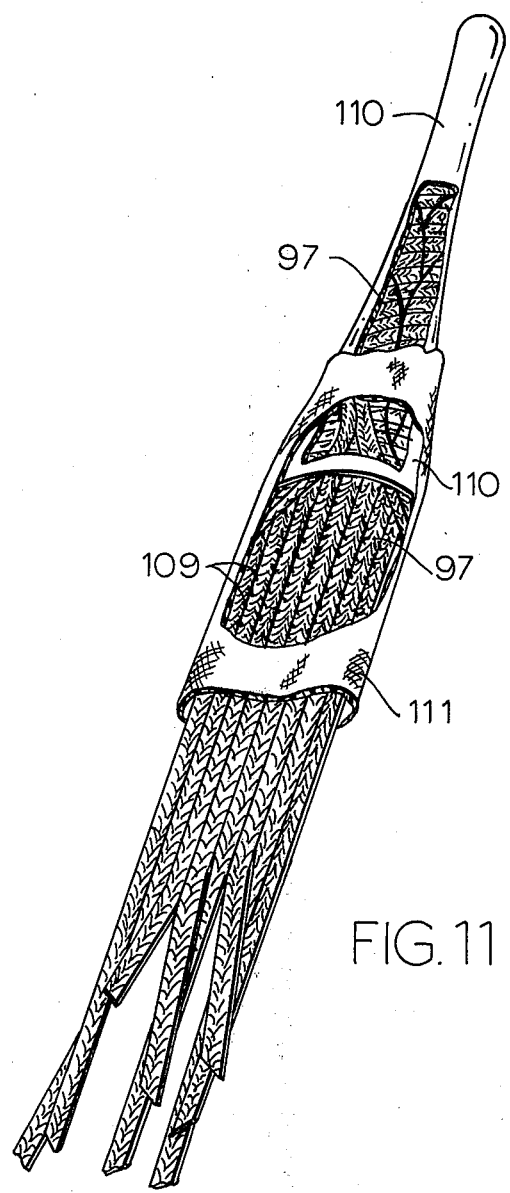
FIG. 11 is a view in perspective, with layers successively broken away, of a portion of the elbow prosthesis of FIG. 6, showing particularly the longitudinally extending cords that reinforce this form of the prosthesis.

The elbow prosthesis of FIGS. 6 and 7

FIGS. 6 and 7 show another modified form of elbow prosthesis 90, similar in most respects to the prosthesis 70 except for the exterior reinforcing and stabilizing means. An upper stem 91 tapers to a road shoulder 92 at its base, where it joins an upper end portion 93 of the hinge portion. A lower stem 94 also tapers to a broad contoured shoulder 95 at its base, where it joins a lower end portion 96 of the hinge. The stems form an included angle with the web 98 which may be in the range of 90°–160°. The stems 91 and 94 each have internal fibrous reinforcement 97 similar to that of the prosthesis 70, preferably of cords, more preferably braided cords, which also extends through the hinge portion and is arranged longitudinally through a web 98. The reinforcement 97 is impregnated with elastomer, and further cushioning is provided by an elastomer 99 particularly in the bulkier areas of the upper and lower end portios 93 and 96 of the hinge. The stems 91 and 94 are covered with tissue-ingrowth-receptive fabric 100, generally a mesh or velour, in the manner described previously for the prosthesis 40.

It will be noted that the upper stem 91 does not have exterior stabilizing buttresses at its base as in the prostheses 40 and 70. Instead, exterior reinforcement and stabilization of the stem is provided by a cuff 101. This cuff 101 comprises a relatively firm but flexible sheet having an inner tissue-ingrowth-receptive surface 102 and a smooth outer elastomeric surface 103. The cuff 101 is secured to the base of the upper stem 91 by stitches 104 or, additionally, adhesive may be used. As shown in FIG. 6, the cuff 101 is formed of one piece of sheet wrapped around the base of the stem 91 so that its two ends 105 and 106 meet. The cuff 101 can also consist of two or more flaps which abut each other. The cuff 101 is designed to wrap tightly around the exterior bony surface of the resected humerus after the stem 91 has been implanted into the medullary canal of the humerus. In this way, ingrowth of the bone into the pores of the interior surface 102 causes the prosthesis to be stabilized and helps to prevent secondary hinge effects or subluxation at the base of the stem. Suture cords 107 may be attached at various places near the upper edge of the cuff 101 in order that the cuff may be secured to the bone temporarily so as to prevent rotational or longitudinal movement of the stem 91 until such time that tissue growth into the inner surface of the cuff and the outer surface of the stem has taken place. Suture cords 108 may be securely attached at shoulder 95 of the base of stem 94 for similarly providing means for temporary stabilization of stem 94 until tissue ingrowth occurs to provide a permanent, firm bond with stem 94.

The elbow prosthesis of FIGS. 8 and 9

FIGS. 8 and 9 show still another form of elbow prosthesis 120, which is substantially like the prosthesis 90 except that in addition to the exterior reinforcing and stabilizing cuff 101, the upper stem 91 has a rigid metal or plastic reinforcing member 121. The reinforcing core member 121 may be shaped similarly to the core member 53 of the prosthesis 40, or it may have another shape so as to provide rigidity particularly in the area of the upper part of the upper portion 93 of the hinge section and in the base portion of the stem 91, for prevention of secondary hinge effects. For example, the core member 121 may be broader or thicker to occupy more of the base of the stem 91 and the upper portion 93 of the hinge section. This prosthesis 120 is particularly desirable for replacement of an albow where a higher resection of the humerus is necessary. In these situations, the upper portion 93 of the prosthesis 120 would be made longer, and the shoulder 92 of the base of stem 91 would be made smaller to accommodate to the smaller area of bone resulting from a higher resection.

In both prostheses 90 and 120, a second cuff, i.e., a cuff incorporated around the base of lower stem 94, may also be included. In addition, suture cords 107 on cuff 101 and suture cords 108 secured to the base of stem 94 may be incorporated.

Figure 12:
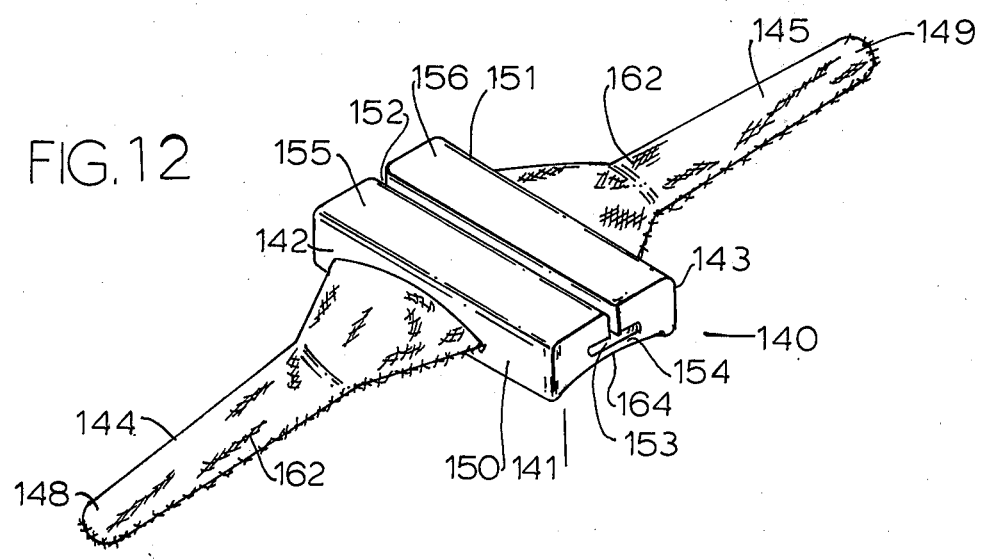
FIG. 12 is a view in perspective of a knuckle prosthesis embodying the principles of the invention.

The knuckle prosthesis of FIGS. 12–14

FIGS. 12–14 show a knuckle prosthesis 140 of the present invention. The prosthesis 140 has a centrally located hinge portion 141 with generally thick ends 142 and 143 to which stems 144 and 145 are joined. The stems 144 and 145 are thicker in cross section at their bases 146 and 147 and then taper to extremities 148 and 149 that are smaller in cross section. The ends 142 and 143 extend beyond the bases of the stems 144 and 145 to form shelves 150 and 151, against which the resected ends of the bones of a knuckle joint abut.

The hinge portion 141 is a generally rectangularly shaped block with a narrow vertical slot 152 located midway in the block and transversely to the direction of the stems and extending downward more than halfway through the block. Perpendicular to this vertical slot 152 is a narrow horizontal slot 153 contiguous with the bottom of the slot 152 and also extending transversely to the stems, so as to form an inverted T in combination with the slot 152. This combination of vertical and horizontal slots generates a narrow web 154 extending all the way across the hinge portion and essentially joins the two halves 155 and 156 of the hinge portion 141. The web 154 has some width or is shaped more like a strap because of the presence of the horizontal slot 153. There is an advantage to this strap-like configuration of the web 154, in that when bending in this region takes place, the stresses generated by bending motion are distributed over a wider area and are thus less destructive to the elastomeric material in the web 154. This is not the case with hinged prostheses which have essentially no width in the flexing area of the web, for then stresses are concentrated in a very narrow area, and this can result in more rapid destruction of the web. Opposite the slot 152 the web 154 has a curved surface 164, thinnest in the center and wider at the ends, nearer the stems 144 and 145. This improves flexure by minimizing the amount of elastomeric material that has to flow during flexure.

The interior of the prosthesis 140 contains a multiplicity of longitudinally arranged cords 158, preferably Dacron cords, which provide reinforcement necessary for increasing the flex life of the web 154 and to stiffen the area where the stems join the hinge portion so as to resist secondary hinge effects or bending at this point. This reinforcement also stiffens the stems so that they can be more readily inserted into the medullary canals of the bones. The cords 158 extend all the way through the prosthesis, and through the hinge portion 141 they are arranged substantially parallel across most of the width of the hinge portion 141.

Suture cords 159 may be secured to the bases 146, 147 of the stems 144, 145, but preferably they may be part of the outermost cords 158 which extend through the hinge portion 141 and then, instead of continuing down into the stems, are brought outside the prosthesis at the junctures between the stems 144, 145 and the hinge portion 141. These suture cords 159, particularly in the preferred mode of attachment, resemble natural collateral ligaments when they are tied into holes drilled near the ends of the resected bones of the knuckle. They give immediate stability to the prosthesis 140 following implantation so that it cannot rotate or slip out from the canals.

The reinforcing cords 158 in the region of the stems 144, 145 are preferably gathered together as a bundle, and they may be twisted or braided. Primarily for convenience at the time of making the prosthesis, the reinforcing cords 158 may be woven through a layer of mesh 160, preferably Dacron mesh, or they may be made to adhere to the mesh layer 160 as with raw silicone rubber or adhesive. In this way, it becomes easier to prearrange the cords 158 in the desired longitudinal manner, and it becomes easier to layer them in a suitable mold so that an elastomer 161, such as silicone rubber, can be applied to embed the reinforcing cords 158. The mesh 160 is not essential, however, and is not relied on for reinforcement at the hinge portion 141.

Following the molding and curing of the elastomer 161 around the reinforcing cords 158 and mesh layer 160, the stems 144, 145 are covered with an open-pore, tissue-ingrowth-receptive material 162, such as Dacron mesh or velour. If mesh is used, preferably there are at least two layers, and these are secured by stitches running through the reinforcing cords 158.

It should be noted that the stems in the knuckle prosthesis 140 are angled from the hinge portion 141, somewhat like that for the elbow prostheses, although not quite as pronounced. In the knuckle prosthesis, the included angle between the stems when the web portion is in a "rest position" is about 130° to about 160°. In the embodiment shown, this angle is 160°.

In an elbow prosthesis, this angle is preferably from 90° to 155°, more preferably 100° to 120°, and most preferably 105° when taken from a base obtained if the two stems are extended in a straight line. This most preferred angle or "rest position," i.e., 105°, provides for the hinge having to flex no more than about 60° in either direction under maximum flexion or extension of the forearm, thus reducing the possibility for extreme distortion or bending and consequently greatly increasing the life of the most vulnerable portion, i.e., the web portion of the hinge.

Another important consideration for having an angle in the "rest position" for such hinged prostheses is that, following implantation, when the natural body structure is in its normally resting position, there will be little or essentially no bending of the web in the implanted prosthesis. This also extends the life of the prosthesis. Manufacturers of prostheses In making the prosthesis of this invention, the following describes one typical approach.

A multiplicity of Dacron strands or cords 97, preferably braided, are impregnated with unvulcanized Silastic and are arranged in a mold partially filled with unvulcanized Silastic so that they extend from stem tip to stem tip. The cords, braided or unbraided, are braided in the stem portions or they may be twisted or merely arranged side by side. If a metal reinforcing member is to be included in the upper stem, it is layered between the cords at this point. In the hinge area, the cords are loosely bound to each other with stitches 109 and are flared to nearly the full width of the hinge portion so that they lie in a single plane. Unvulcanized Silastic is placed in the mating mold, the two are clamped, and the product is vulcanized. The stems may then be wrapped with a layer 110 of silicone rubber reinforced with Dacron mesh. Optionally, the entire body of the prosthesis may then be wrapped with a layer 111 of silicone rubber reinforced with Dacron mesh. Tissue ingrowth material is applied on the stem portions, preferably Dacron mesh or velour. When using mesh, preferably there are two to four layers of mesh, which are secured to the reinforced stems by stitching. When using velour, a layer of velour is stitched on; preferably, the velour has a backing of unvulcanized Silastic so that the layer is then vulcanized to the stem. It may be further secured with stitching.

In those forms of the prosthesis which have a cuff, the cuff is secured to the shoulder portion with stitches. The cuff comprises an outer layer of Silastic and an inner layer of ingrowth material such as velour. The completed prosthesis may then be cured for an additional period of time. Tie cords may be installed at the base of the lower stem and at positions near the top of the cuff for tying into the ulna and humerus.

Surgical insertion of elbow prostheses of this invention

Surgical insertion of the prosthesis is accomplished with conventional techniques. The example of the elbow will be explained as representative in a general way of other stemmed intramedullary prostheses.

1. Beginning with a clean sterile prosthesis, and patient under general anesthesia, the arm is exsanguinated and hemostasis achieved with tourniquet to achieve a relatively bloodless field of operation. A posterior skin incision is made adjacent to the elbow joint taking care to develop generous skin flaps and exercising caution to isolate and preserve the nerves passing through the joint.

2. The distal end of the humerus is exposed and cleaned of all soft tissue prior to resecting it horizontally at a level just proximal to the coronoid and olecranon fossae. Removal of this distal fragment provides easy access to the proximal radius and ulna. Since full restoration of motion is intended, care is taken to preserve all possible operative muscular structure. The origins of the forearm muscles and the collateral ligaments are of necessity resected from the distal humerus fragment.

3. The radial head is excised at the neck and the proximal ulna is resected along a line running from the tip of the olecranon to the coronoid process, effectively removing the articular surface of the joint in such a fashion that a firm angular bony shelf is created to match the corresponding shelf identified as item 44, FIG. 1, the shoulder 77 in FIG. 5, or the shoulder 95 in FIGS. 6 and 8 of the prosthesis.

4. Access to the open resected end of the ulna and the humerus enables the medullary canals to be reamed out to receive the prosthesis stems using drills and rasp. On the distal humerus a pair of notches are cut corresponding to buttress detail 51, FIGS. 1 and 2, or the buttress detail 82, FIG. 5, if either of these forms of the prosthesis is used.

5. After seating the prosthesis stems fully and snugly, the elbow may be flexed through the full range of motion after which temporary fixation by means of wires and/or sutures placed through the shoulder of the prosthesis (location 44 and 45, FIGS. 1 and 2 or by suture cords 108, FIGS. 6 and 8 if these are present) and drilled bone are added to serve until fibrous ingrowth is obtained in the stems.

If either prosthesis 90 or 120 is used, the outer surface of the resected end of the humerus is abraded to provide a raw, bleeding surface, and the cuff 101 is wrapped snugly against the raw surface of the bone. Any excess overlying portions of the ends 105 and 106 is trimmed, and the ends are sutured together. Suture cords, 107, if present, are used to secure the cuff further to the bone by inserting through drilled holes in the bone and tying.

6. Routine closure is accomplished reattaching portions of the triceps. Postoperatively the elbow is immobilized for a period of four weeks prior to initiating motion.

7. Numerous clinical cases in which the foregoing procedure was followed resulted in satisfactory, pain-free, relatively stable restoration of normal function. In most cases the elbow and distal humerus was missing as a result of trauma and prior surgical repair. Other cases have involved traumatic wounds with painful articulation and loss of motion due to late developing traumatic arthritis.

Surgical insertion of knuckle prostheses of this invention

1. Beginning with a clean sterile prosthesis (interphalangeal or metacarpal-phalangeal), a sterile operating field and a patient under general anesthesia, the arm is exsanguinated to provide a bloodless field and hemostasis is achieved by upper arm tourniquet. A dorsal incision is made for the metacarpalphalangeal prosthesis exposing the extensor tendon and joint capsule. Exposure of the joint proceeds with meticulous care to preserve tissues for later reconstruction.

2. Collateral ligaments are resected free from the metacarpal head to enable the joint to be dislocated. The head of the metacarpal is then resected transversely taking care to provide a space wide enough to accommodate the central hinge portion of the prosthesis and to slacken tissues sufficient to permit realignment without residual force on the joint or tissues.

3. Medullary canals proximally and distally are broached to receive the stems of the prosthesis. The prosthesis is test-fitted in place and the finger or fingers flexed through a full range of motion to demonstrate satisfactory function.

Approximately 2 millimeters back from the open ends of each bone, two small holes are drilled through the dorsal surface, one on the medial aspect and one on the lateral side to receive bone-anchoring sutures 159 provided in the body of the prosthesis medially and laterally.

4. The wound is cleaned of all fragments and irrigated with an antibiotic solution. The prosthesis is similarly treated and dipped in antibiotic solution.

5. The prosthesis is inserted in the prepared medullary canals by first attaching needles to the bone-anchoring sutures and leading them through the four drilled holes in the two bones. These sutures 159 are cords of substantial strength placed to resemble (and substitute for) the natural collateral ligaments and to provide prompt stability and restoration of joint function by immediately anchoring the prosthesis stems to bone. This enables the benefits of early joint motion and simultaneously gives the healing benefit of immobilization within the bone for earlier, firmer tissue ingrowth. The two proximal sutures are drawn tight and knotted to one side of the bone thereby anchoring the proximal stem. The two distal sutures are drawn snug and knotted, anchoring the distal stem. The finger is then manipulated through a full range and lateral stability tested. Adjustments are made if indicated.

6. The resected collateral ligaments may be repositioned for reattachment and may be sutured proximally to the bone-anchoring sutures if desired to obtain the benefit of a prosthetic "Dacron Bridge" to aid in their reattachment.

7. The joint capsule is closed, taking pains to reconstruct soft tissue alignment and to place the extensor tendon in correct dorsal alignment. The skin is closed. The hand is bandaged and placed in a cast or in a splint with the finger or fingers at substantially the angle to the joint as that of the at-rest prosthesis, e.g., 150° to 160°. Motion is undertaken after the first week in a carefully supervised manner, and the unrestricted use of the hand is not allowed for 4–6 weeks.

The above specific description and drawings have been given for purposes of illustration only and modifications and variations can be made therein without departing from the spirit and scope of the appended claims. Where "rubber," "rubbery elastomer" or "elastomer" are mentioned herein, it will be understood that medical grade material is meant; and an especially useful material is available in commerce under the trademark "Silastic" (Dow Corning Co.).

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A prosthesis for replacement of a skeletal hinged joint, comprising:
   first and second stems each adapted to be inserted into a medullary canal of a bone of said joint, and
   a flexing web integral with said stems, joining said stems and acting as a hinge to enable the first and second stems to swing relatively to each other,
   said stems lying in a common plane and inclined to each other to make an included angle, with said web at the vertix, which in its at-rest non-flexed position is between 90° and 160°,
   each said stem and said web having a reinforcing core and a cushioning coating of elastomer,
   each said stem but not said web also having an outer layer with an open-pore three-dimensional reticular structure adapted to receive host tissue ingrowth, said core being continuous through said stems and web and comprising a series of longitudinally extending cords which at said web are coplanar to increase lateral stability.

2. The prosthesis of claim 1 wherein said coating of elastomer contains fibers and is bonded to and at least partially encloses said core.

3. The prosthesis of claim 1 for use in an elbow wherein said included angle lies between about 100° and 120°.

4. The prosthesis of claim 1 for use in finger joints wherein said included angle lies between about 130° and 160°.

5. The prosthesis of claim 1 wherein said cords are spaced apart at said web and are gathered together at said stems.

6. The prosthesis of claim 5 wherein said cords are twisted together at said stems.

7. The prosthesis of claim 1 having in addition a rigid reinforcing member in at least one of said stems.

8. The prosthesis of claim 1 wherein cords extend out through at least one of said stems to provide sutures for installation.

9. The prosthesis of claim 1 having sutures binding said core, uticular structure and elastomer together.

10. The prosthesis of claim 1 for use in an elbow wherein said first stem has a flattened conical shape for fitting into the medullary canal of an ulna.

11. The prosthesis of claim 10 wherein said second stem has a stabilizing portion with keyed exterior shape disposed perpendicularly to the plane of said web at the base of said second stem for fitting into key notches provided in a humerus.

12. The elbow prosthesis of claim 11 wherein said keyed exterior shape is triangular in cross section.

13. The elbow prosthesis of claim 11 wherein said keyed exterior shape comprises rounded rectangular buttresses.

14. The prosthesis of claim 1 wherein said web is large in width and thin in thickness to restrict the relative swinging motion of said stems along a single plane.

15. The prosthesis of claim 14 wherein said web is wider than said stems and thinner than them.

16. The prosthesis of claim 1 wherein said core further includes two separate rigid members, one for each said stem, neither said rigid member extending through said web.

17. The prosthesis of claim 16 wherein said rigid members are metal.

18. The prosthesis of claim 1 wherein said web has a thin central portion between two thicker portions and an inverted tee slot overlying said thin portion between said thicker portions on one face of said thin portion for distributing bending forces over a substantial area of said thin portion.

19. The prosthesis of claim 18 wherein said thin portion has, on the surface opposite from said slot, a curved surface thinnest at the middle and thicker nearer said stems.

20. A prosthesis for replacement of a skeletal hinged joint, comprising:

a unitary member having a central hinge portion and a stem connected at each end of said hinge portion, each said stem having a base and adapted for insertion into a medullary canal of a bone of the joint, said hinge portion having a thin central web portion and thicker end portions where they join said stems providing uniplanar hinge-like movement about said web portion when said stems are implanted in said canals, said stems being inclined with respect to said web portion to provide an included angle of at least 90° and no more than about 160° when said web portion is in an unflexed condition, said unitary member being made of elastomer and having internal reinforcing means extending through said hinge portion and said stems, said stems having an open-pore, three-dimensional, reticular outer layer for three-dimensional tissue ingrowth, said reinforcing means comprising a series of longitudinally extending cords which at said web portion are coplanar to increase lateral stability.

21. The prosthesis of claim 20 wherein said reinforcing means occupies substantially all the interior space of said stems.

22. A prosthesis as in claim 20 for use in an elbow wherein said included angle lies between 100° and 120°.

23. A prosthesis as in claim 20 for use in finger joints wherein said included angle lies between 130° and 160°.

24. A prosthesis as in claim 20 including suturing means at said base of at least one said stem.

25. A prosthesis as in claim 20 wherein said base of at least one of said stems has a stabilizing buttress shaped to fit into a notch provided in the resected head of said bone of the joint and disposed perpendicularly to the plane of said hinge portion.

26. The prosthesis of claim 20 wherein said reinforcement is cords gathered into a generally cylindrical configuration in each said stem.

27. The prosthesis of claim 26 wherein said cords are secured to each other by stitches.

28. A prosthesis as in claim 20 wherein said cords are braided.

29. A prosthesis as in claim 20 wherein said internal reinforcing means further includes a rigid core member embedded within at least one of said stems as well as a portion of said end portion adjacent said stem but not extending into said web.

30. A prosthesis for replacement of a skeletal hinged joint, comprising:

a unitary member having a central hinge portion and a stem connected at each end of said hinge portion, each said stem having a base and adapted for insertion into a medullary canal of a bone of the joint, said hinge portion having a thin central web portion and thicker end portions where they join said stems providing uniplanar hinge-like movement about said web portion when said stems are implanted in said canals, said stems being inclined with respect to said web portion to provide an included angle of at least 90° and no more than about 160° when said web portion is in an unflexed condition, said unitary member being made of elastomer and having internal reinforcing means extending through said hinge portion and said stems, to increase lateral stability, said stems having an open-pore, three-dimensional reticular outer layer for three-dimensional tissue ingrowth, said reinforcing means including a plurality of fibers extending longitudinally and continuously through said member, and a rigid core member embedded within at least one of said stems as well as a portion of said end portion adjacent said stem but not extending into said web, said prosthesis further including a stabilizing cuff member secured at said base of said stem containing said rigid core member and extending outwardly therefrom to surround loosely at least a portion of said stem, said cuff member having an open-pore inner surface adapted for ingrowth of tissue, said cuff member being adapted for encirclement of the exterior of the bone in which its associated said stem is inserted.

31. A prosthesis as in claim 30 further including suturing means secured at said base of the other said stem and in an outer portion of said cuff member.

32. A prosthesis for replacement of a skeletal hinge joint, comprising:

a unitary member having a central hinge portion and a stem connected at each end of said hinge portion, each said stem having a base and adapted for insertion into a medullary canal of a bone of the joint, said hinge portion having a thin central web portion and thicker end portions where they join said stems providing uniplanar hinge-like movement about said web portion when said stems are implanted in said canals, said stems being inclined with respect to said web portion to provide an included angle of at least 90° and no more than about 160° when said web portion is in an unflexed condition, said unitary member being made of elastomer and having internal reinforcing means extending through said hinge portion and said stems, to increase lateral stability, said stems having an open-pore, three-dimensional, reticular outer layer for three-dimensional tissue ingrowth, said prosthesis further including a stabilizing cuff member secured at said base of one of said stems and extending outwardly therefrom and loosely around at least a portion of said stem, said cuff member having an open-pore inner surface adapted for ingrowth of tissue, said cuff member being adapted for encirclement of the exterior of the bone in which its associated said stem is inserted.

33. A prosthesis as in claim 32 further including suturing means secured at said base of the other said stem and in an outer portion of said cuff member.

34. A prosthesis for replacement of a damaged or diseased elbow joint, comprising:

a unitary, elastomeric member having a central hinge portion thicker at each end and thinner in its central web portion with a first stem joined to one said end and second stem joined to the other said end, each said stem having a base portion, said member having internal fiber reinforcement substantially throughout and an open-pore, tridimensional, reticular layer on the outer surface of said first and second stems, and a cuff member encircling said base of said first stem and extending outwardly therefrom to surround at least a portion of said first stem, said cuff member having an open-pore inner surface adapted for ingrowth of tissue.

35. The prosthesis of claim 34 wherein said first and second stems are inclined with respect to said web portion to provide an included angle of at least 90° and no more than 160° when said web portion is in an unflexed condition.

36. A prosthesis of claim 34 further including a rigid core member embedded within said first stem and a portion of said end of said hinge portion to which said first stem is joined.

37. A prosthesis of claim 34 wherein said reinforcement comprises a multiplicity of longitudinally arranged fibers.

38. A prosthesis of claim 34 further icluding suturing means secured in said base of said second stem.

* * * * *

UNITED STATES PATENT OFFICE
CERTIFICATE OF CORRECTION

Patent No. 3,886,600      Dated June 3, 1975

Inventor(s) Paul Kahn and James A. Stubstad

It is certified that error appears in the above-identified patent and that said Letters Patent are hereby corrected as shown below:

Column 3, line 15, "achoring" should read --anchoring--.

Column 5, line 48, "polyrethane" should read --polyurethane--.

Column 6, line 43, "icluded" should read --included--.

line 62, "guite" should read --quite--.

line 63, "guite" should read --quite--.

Column 7, line 18, "road" should read --broad--.

line 32, "portios" should read --portions--.

Column 8, line 15, "albow" should read --elbow--.

Column 12, line 62, which is line 10 of claim 1, "vertix" should read --vertex--.

Column 13, line 27, which is line 2 of claim 9, "uticular" should read --reticular--.

Column 16, line 41, which is line 1 of claim 38, "icluding" should read --including--.

Signed and Sealed this second Day of September 1975

[SEAL]

Attest:

RUTH C. MASON
*Attesting Officer*

C. MARSHALL DANN
*Commissioner of Patents and Trademarks*